(12) United States Patent
Yamanishi et al.

(10) Patent No.: US 10,141,775 B2
(45) Date of Patent: Nov. 27, 2018

(54) MOBILE-TERMINAL-CHARGING DEVICE AND VEHICLE IN WHICH SAME IS MOUNTED

(71) Applicant: Panasonic Intellectual Property Management Co., Ltd., Osaka (JP)

(72) Inventors: Yuto Yamanishi, Kanagawa (JP); Ken Hatakeyama, Kanagawa (JP); Tomohiro Ota, Hyogo (JP); Takeshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 15/307,075

(22) PCT Filed: May 14, 2015

(86) PCT No.: PCT/JP2015/002446
§ 371 (c)(1),
(2) Date: Oct. 27, 2016

(87) PCT Pub. No.: WO2015/177994
PCT Pub. Date: Nov. 26, 2015

(65) Prior Publication Data
US 2017/0054320 A1 Feb. 23, 2017

(30) Foreign Application Priority Data
May 19, 2014 (JP) ................................. 2014-103085

(51) Int. Cl.
*H02J 7/00* (2006.01)
*H02J 7/14* (2006.01)
(Continued)

(52) U.S. Cl.
CPC ............ *H02J 7/1461* (2013.01); *B60N 3/001* (2013.01); *B60N 3/002* (2013.01); *B60R 11/02* (2013.01);
(Continued)

(58) Field of Classification Search
USPC ......................................................... 320/108
See application file for complete search history.

(56) References Cited

U.S. PATENT DOCUMENTS

| 2009/0153098 A1 | 6/2009 | Toya et al. | |
| 2012/0091948 A1* | 4/2012 | Shinde | B60R 7/04 320/108 |

(Continued)

FOREIGN PATENT DOCUMENTS

| JP | 2009-247194 | 10/2009 |
| JP | 2012-016125 | 1/2012 |

OTHER PUBLICATIONS

Extended European Search Report dated May 12, 2017 in corresponding European Patent Application No. 15795757.2.

(Continued)

*Primary Examiner* — Robert Grant
(74) *Attorney, Agent, or Firm* — Wenderoth, Lind & Ponack, L.L.P.

(57) ABSTRACT

This mobile terminal charging device has a support plate in which the front surface-side part is where a mobile terminal is installed, a charging coil disposed facing the support plate on the rear surface-side of the support plate, a plurality of detection coils concentrically disposed in the charging coil on a surface opposite the support plate, and a control unit connected to the detecting coils. When a charging operation is carried out, the control unit compares the difference between a voltage value detected using a first detecting coil among the plurality of detecting coils, and a voltage value (Continued)

detected using two detecting coils from a group comprising the first detecting coil and at least one detecting coil disposed outward of the first detecting coil. In addition, the control unit executes a safety operation in accordance with the results of the comparison.

12 Claims, 12 Drawing Sheets

(51) Int. Cl.
| | |
|---|---|
| *H02J 50/10* | (2016.01) |
| *H02J 50/90* | (2016.01) |
| *H02J 7/02* | (2016.01) |
| *H02J 50/70* | (2016.01) |
| *H02J 50/60* | (2016.01) |
| *B60N 3/00* | (2006.01) |
| *B60R 11/02* | (2006.01) |
| *H04M 1/04* | (2006.01) |
| *B60R 11/00* | (2006.01) |

(52) U.S. Cl.
CPC .......... *H02J 7/0042* (2013.01); *H02J 7/0044* (2013.01); *H02J 7/025* (2013.01); *H02J 7/027* (2013.01); *H02J 50/10* (2016.02); *H02J 50/60* (2016.02); *H02J 50/70* (2016.02); *H02J 50/90* (2016.02); *B60R 11/0241* (2013.01); *B60R 2011/0007* (2013.01); *B60R 2011/007* (2013.01); *B60R 2011/0075* (2013.01); *H04M 1/04* (2013.01)

(56) References Cited

U.S. PATENT DOCUMENTS

| | | | |
|---|---|---|---|
| 2013/0099592 A1* | 4/2013 | Abe | H02J 5/005 307/104 |
| 2013/0127255 A1 | 5/2013 | Tsujimoto | |
| 2013/0162202 A1* | 6/2013 | Wang | G06F 3/044 320/108 |
| 2013/0307346 A1 | 11/2013 | Arisawa et al. | |

OTHER PUBLICATIONS

International Search Report of PCT application No. PCT/JP2015/002446 dated Aug. 4, 2015.

* cited by examiner

Density and sparsity of magnetic flux density change

Magnetic flux line of eddy current

Density and sparsity of magnetic flux density change

MOBILE-TERMINAL-CHARGING DEVICE AND VEHICLE IN WHICH SAME IS MOUNTED

FIELD OF THE INVENTION

The present invention relates to a mobile-terminal-charging device which charges a mobile terminal such as a mobile telephone, and a vehicle in which the mobile-terminal-charging device is mounted.

DESCRIPTION OF THE RELATED ART

Mobile terminals such as mobile telephones have very high functions and consume larger electric power accordingly. Hence, it is demanded that the mobile terminals are charged everywhere including an inside of a car. However, recently, mobile-terminal-charging devices which enable so-called non-contact charging without using cables tend to be gaining attention.

That is, such a mobile-terminal-charging device includes a support plate whose front surface side is a mobile-terminal-placement portion, and a charging coil which is disposed at a back surface side of the support plate to face to the support plate. When a mobile terminal is placed on the mobile-terminal-placement portion, magnetic fluxes from the charging coil can charge the mobile terminal (similar devices are disclosed in, for example, PTL 1 and PTL 2).

CITATION LIST

Patent Literatures

PTL 1: Unexamined Japanese Patent Publication No. 2012-16125

PTL 2: Unexamined Japanese Patent Publication No. 2009-247194

SUMMARY OF THE INVENTION

The present invention provides a mobile-terminal-charging device which includes foreign object detector which reduces an influence caused by a difference in a type of a mobile terminal to be charged and has high versatility and is user-friendly.

A mobile-terminal-charging device according to one aspect of the present invention includes a support plate, a charging coil, a plurality of detecting coils and a controller. A front surface side of the support plate is a mobile-terminal-placement portion. The charging coil is disposed at a back surface side of the support plate to face to the support plate. A plurality of detecting coils is coaxially disposed on a plane of the charging coil facing to the support plate. The controllers are connected to these detecting coils. During a charging operation, the controller compares a voltage value detected by the first detecting coil among a plurality of detecting coils, and a difference between voltage values detected by two detecting coils in a group including the first detecting coil and at least one detecting coil disposed at an outer side of the first detecting coil. Further, according to a result of this comparison, the controller causes a safety operation to be executed. Furthermore, another aspect of the present invention is a vehicle in which the above mobile-terminal-charging device is mounted in a vehicle interior.

Such a metal foreign object detecting operation reduces an influence caused by a difference in a type of a mobile terminal to be charged. Hence, the mobile-terminal-charging device has high versatility and is highly user-friendly.

DETAILED DESCRIPTION OF THE PREFERRED EMBODIMENTS

Prior to description of exemplary embodiments of the present invention, a problem in a conventional mobile-terminal-charging device will be briefly described. According to the conventional example, when a metal foreign object such as a coin is placed on a mobile-terminal-placement portion of a support plate and a mobile terminal is placed on the coin, a foreign object detector detects the coin and stops, for example, electric power supply to a charging coil.

Hence, magnetic fluxes from the charging coil can suppress a rise in a temperature caused by the foreign object.

However, according to this conventional example, the foreign object detector is configured of a metal detecting antenna coil and an oscillation circuit connected to the metal detecting antenna coil, and therefore is not preferable in terms of versatility.

That is, according to the conventional example, by using a change in an oscillation state of the oscillation circuit which occurs when there is a metal foreign object, the foreign object is detected. Such a configuration is useful to charge the mobile terminal whose characteristics are known in advance. However, when a mobile terminal whose characteristics are not known is charged, there is a case where a change in an oscillation state of the mobile terminal caused by the mobile terminal itself is erroneously detected as a change caused by a foreign object, and the mobile terminal cannot be charged in conclusion, which is not preferable from a viewpoint of versatility.

When, for example, a mobile-terminal-charging device is installed inside a vehicle, an unspecified number of people frequently try to charge various types of mobile terminals. Mobile terminals cannot be charged in this state depending on models of the mobile terminal, and has poor user-friendliness.

A mobile-terminal-charging device according to the exemplary embodiments of the present invention, and a case where the mobile-terminal-charging device is mounted in a vehicle will be described as an example with reference to the accompanying drawings.

First Exemplary Embodiment

Figure 1:
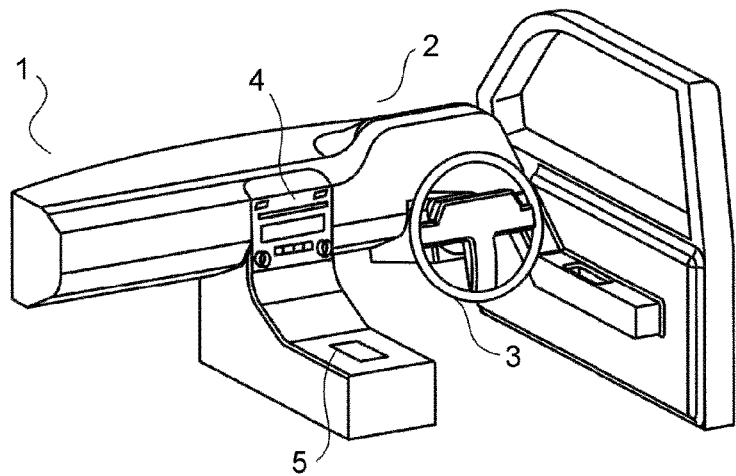
FIG. 1 is a perspective view illustrating a state where a mobile-terminal-charging device according to an exemplary embodiment of the present invention is disposed inside a vehicle.

In FIG. 1, handle 3 is installed at a front side of vehicle interior 2 of vehicle 1. Further, electronic device 4 which plays back music or video images or shows car navigation video images is installed at a side of handle 3.

Furthermore, mobile-terminal-charging device 5 is installed at a rear side of electronic device 4 in vehicle interior 2.

As illustrated in FIGS. 2 to 8, mobile-terminal-charging device 5 includes box-shaped main body case 7 which includes support plate 6 disposed on a front surface, charging coil 8 which is movably provided in a horizontal direction to face to a lower surface side of support plate 6 in main body case 7, driver 9 which moves charging coil 8 facing to the lower surface side of support plate 6 in the horizontal direction, and a controller (controller 10 in FIG. 9) which is connected to driver 9 and charging coil 8.

Each unit will be described in detail below.

Figure 6:
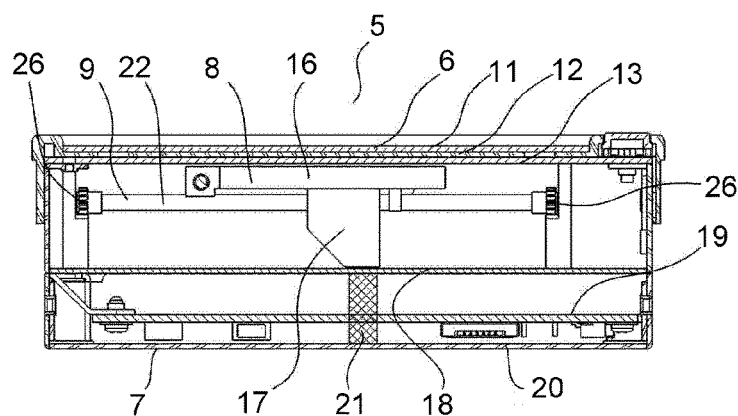
FIG. 6 is a sectional view of the mobile-terminal-charging device taken along broken line S-S' illustrated in FIG. 2.

First, support plate 6 will be described. As illustrated in FIG. 6, support plate 6 is configured by overlaying front surface plate 11, middle plate 12 and back surface plate 13.

Further, front surface plate 11 and back surface plate 13 are made of synthetic resin, and middle plate 12 is made of ceramics. That is, support plate 6 is configured to enable magnetic fluxes from charging coil 8 to pass in a direction of mobile terminal 15.

Figure 9:
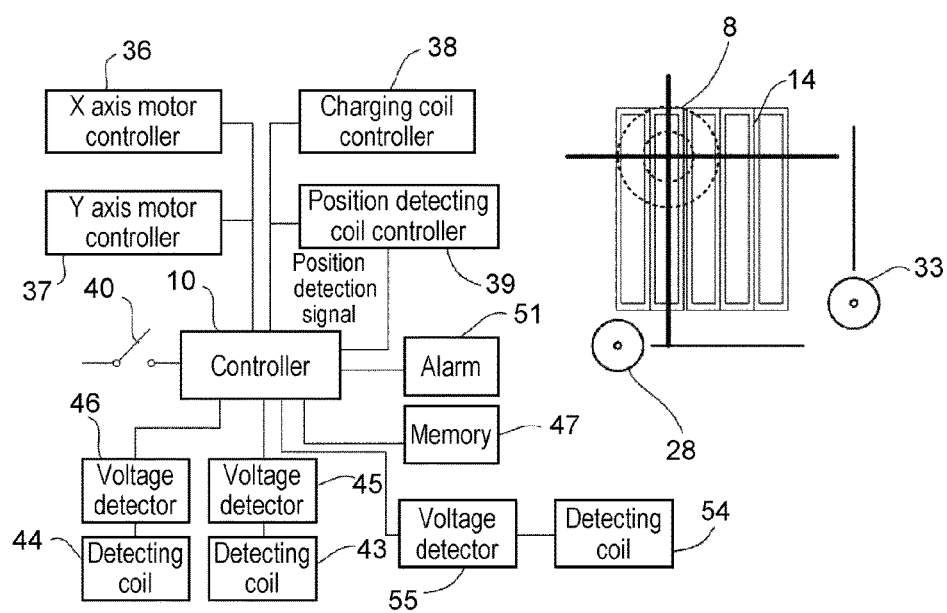
FIG. 9 is a control block diagram of the mobile-terminal-charging device illustrated in FIG. 2.

Further, position detecting coil 14 (an example of a position detector) in FIG. 9 is provided on a surface of middle plate 12.

Figure 3:
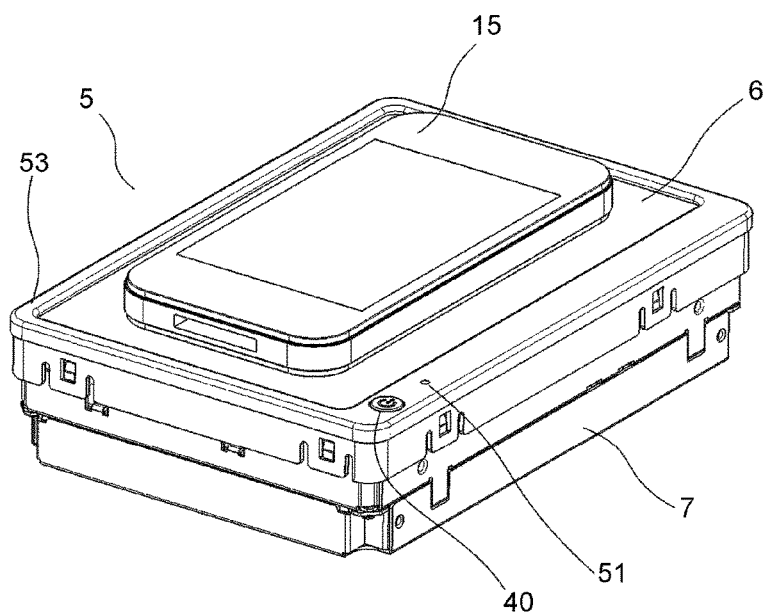
FIG. 3 is a perspective view illustrating a state where a mobile terminal is mounted in the mobile-terminal-charging device illustrated in FIG. 2.

Position detecting coil 14 is used in Patent Literature 2, and detects at which position of the mobile-terminal-placement portion on an upper surface of support plate 6 mobile terminal 15 in FIG. 3 is placed.

The present exemplary embodiment employs a configuration where at which position on the upper surface of support plate 6 mobile terminal 15 is placed as illustrated in FIG. 3 is detected by using position detecting coil 14, and then driver 9 moves charging coil 8 to a position facing to a terminal charging coil (15a in FIG. 13) of mobile terminal 15.

Next, a portion of charging coil 8 will be described. As is understandable from FIGS. 4 and 5, charging coil 8 has a wire spirally wound to form an annular shape, and is held in a state where an outer periphery side and a lower surface side of charging coil 8 are covered by holding body 16 made of synthetic resin.

Further, as illustrated in FIG. 6, support leg 17 extended toward a lower side of charging coil 8 is integrally formed with a lower surface of holding body 16 by using synthetic resin.

Furthermore, a gap of 0.3 millimeters is provided between a lower surface of support leg 17 and an upper surface of metal support plate 18 disposed below support leg 17 and made of metal. In a normal state, when charging coil 8 is moved, the lower surface of support leg 17 does not come into contact with the upper surface of support plate 18.

In addition, control substrate 19 and lower surface plate 20 of main body case 7 are disposed below support plate 18, and support body 21 which penetrates control substrate 19 is provided between a lower surface of support plate 18 and an upper surface of lower surface plate 20.

Figure 4:
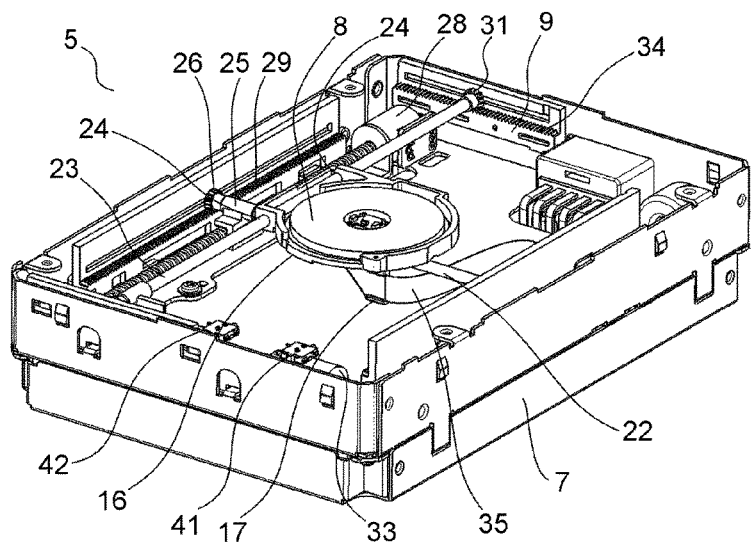
FIG. 4 is a perspective view illustrating a state where part of the mobile-terminal-charging device illustrated in FIG. 2 is removed.
Figure 5:
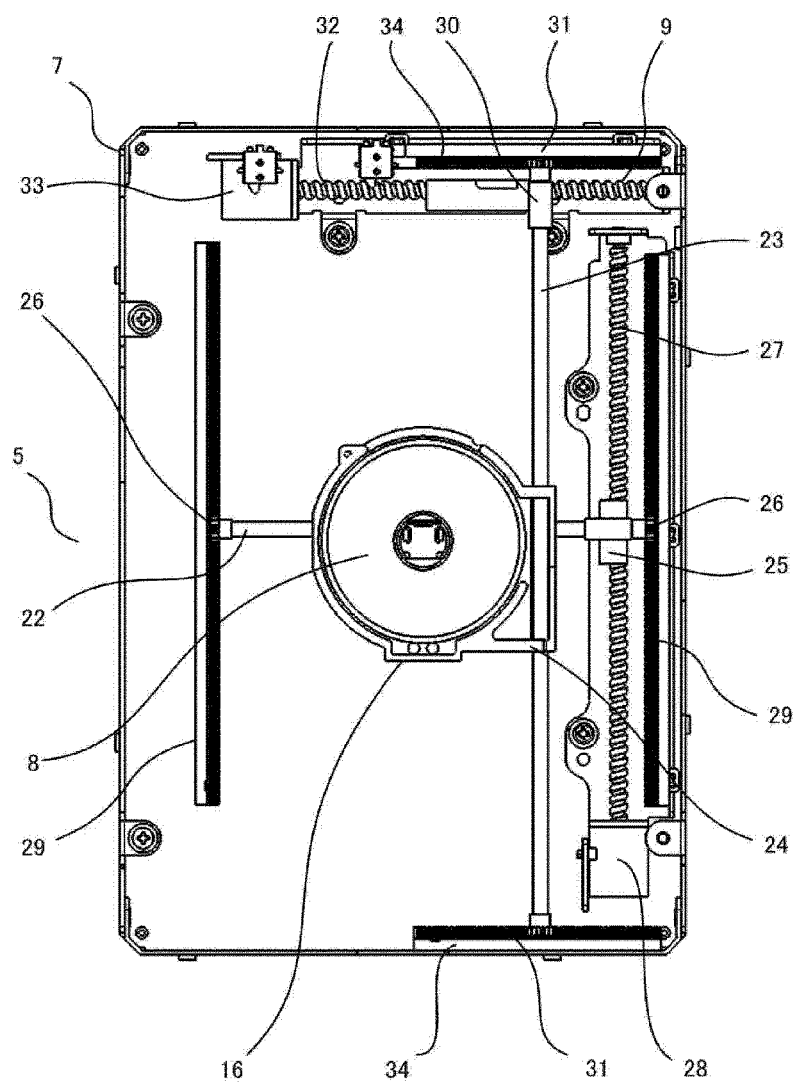
FIG. 5 is a plan view of the mobile-terminal-charging device in the state illustrated in FIG. 4.

Next, driver 9 will be described. As illustrated in FIGS. 4 and 5, driver 9 includes X axis direction driving shaft 22 and Y axis direction driving shaft 23. Respective intermediate portions of these X axis direction driving shaft 22 and Y axis direction driving shaft 23 engage with holding body 16 at an outside of charging coil holder of holding body 16.

That is, in holding body 16, a through-hole (not illustrated) which penetrates X axis direction driving shaft 22 and through-hole 24 which penetrates Y axis direction driving shaft 23 are vertically provided to cross at predetermined intervals. X axis direction driving shaft 22 and Y axis direction driving shaft 23 penetrate the through-hole and through-hole 24 and thereby engage with each other.

Further, worm wheel 25 is provided at one end side of X axis direction driving shaft 22, gear 26 is provided at one end and gear 26 is provided at the other end, too. Furthermore, worm wheel 25 engages with worm 27, and worm 27 is coupled to motor 28.

Still further, gears 26 at both sides engage with gear plates 29, respectively.

Hence, by driving motor 28, worm 27 rotates, thereby worm wheel 25 moves in the X axis direction together with X axis direction driving shaft 22, and then charging coil 8 moves in the X axis direction.

Further, worm wheel 30 is provided at one end side of Y axis direction driving shaft 23, gear 31 is provided at one end and gear 31 is provided at the other end, too. Furthermore, worm wheel 30 engages with worm 32, and worm 32 is coupled to motor 33.

Still further, gears 31 at both sides engage with gear plates 34, respectively.

Hence, by driving motor 33, worm 32 rotates, thereby worm wheel 30 moves in the Y axis direction together with Y axis direction driving shaft 23, and then charging coil 8 moves in the Y axis direction.

In addition, flexible wire 35 illustrated in FIG. 4 supplies electric power to charging coil 8, and an end of flexible wire 35 is fixed to a side surface of above-described support leg 17.

Further, as illustrated in FIG. 9, controller 10 is connected with motor 28 via X axis motor controller 36, and is connected with motor 33 via Y axis motor controller 37.

Furthermore, controller 10 is connected with charging coil 8 via charging coil controller 38, and is connected with position detecting coil 14 via position detecting coil controller 39.

Figure 2:
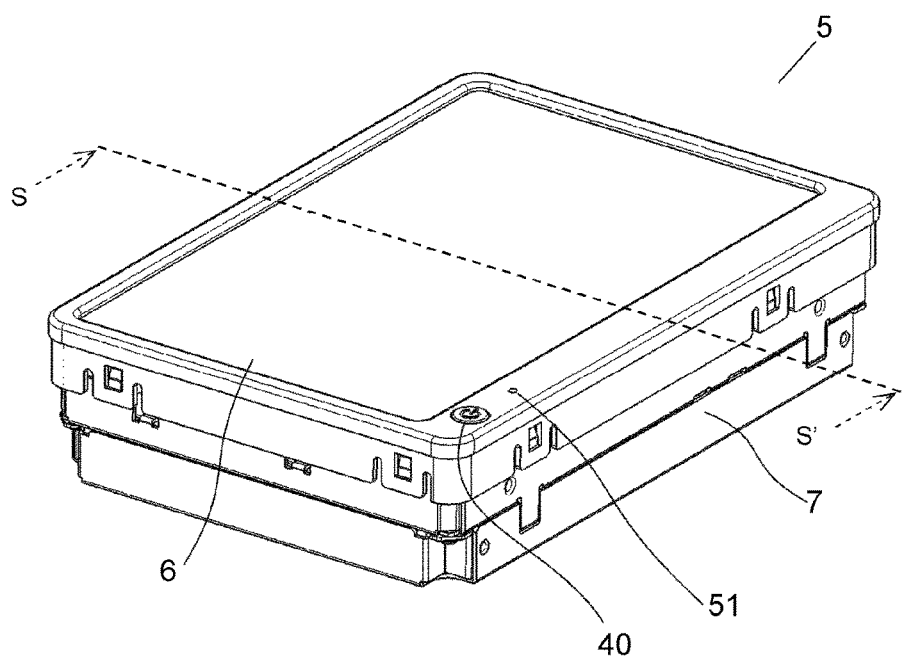
FIG. 2 is a perspective view of the mobile-terminal-charging device according to a first exemplary embodiment of the present invention.

According to the above configuration, in the present exemplary embodiment, when power switch 40 provided at an outer periphery of support plate 6 of main body case 7 illustrated in FIG. 2 is operated to turn off (S1 in FIG. 10), controller 10 moves charging coil 8 to a center of main body case 7 (indicated as point A below) as illustrated in FIGS. 4 to 6 (S2 in FIG. 10) and then turns off the power supply (S3 in FIG. 10).

That is, as illustrated in FIG. 2, in a state where mobile terminal 15 is not placed on support plate 6 of main body case 7, support plate 6 is exposed in vehicle interior 2 as illustrated in FIG. 1.

Hence, a situation in which a hand is placed on support plate 6 by mistake occurs in some cases, and an excessive load is applied to support plate 6 in this case.

Hence, in the present exemplary embodiment, as illustrated in FIGS. 4 to 6, charging coil 8 is moved to the center of main body case 7, and the excessive load is supported by charging coil 8, holding body 16, support leg 17 and support plate 18.

That is, in a state where the excessive load is applied to support plate 6 as described above, support plate 6 is slightly curved downward. In this state, charging coil 8, holding body 16 and support leg 17 also move downward, and the lower surface of support leg 17 comes into contact with the upper surface of support plate 18.

As a result, the above excessive load is supported by support plate 18 via support plate 6, charging coil 8, holding body 16 and support leg 17. Thus, it is possible to prevent support plate 6 and charging coil 8 from being damaged.

In addition, in the present exemplary embodiment, a lower surface side of support plate 18 is configured to be supported by lower surface plate 20 of main body case 7 via support body 21 to enhance strength against the excessive load.

Further, when such an excessive load is removed, support plate 6 elastically returns upward, elastic returns of X axis direction driving shaft 22 and Y axis direction driving shaft 23 return elastic charging coil 8 and holding body 16 upward, too. Then, the lower surface of support leg 17 is disposed with a gap from the upper surface of support plate 18. Hence, subsequent movement of charging coil 8 is not blocked.

Further, when mobile terminal 15 is charged, power switch 40 in FIG. 3 is first placed in an on state (S4 in FIG. 10), and mobile terminal 15 is placed on the upper surface of support plate 6.

Figure 10:
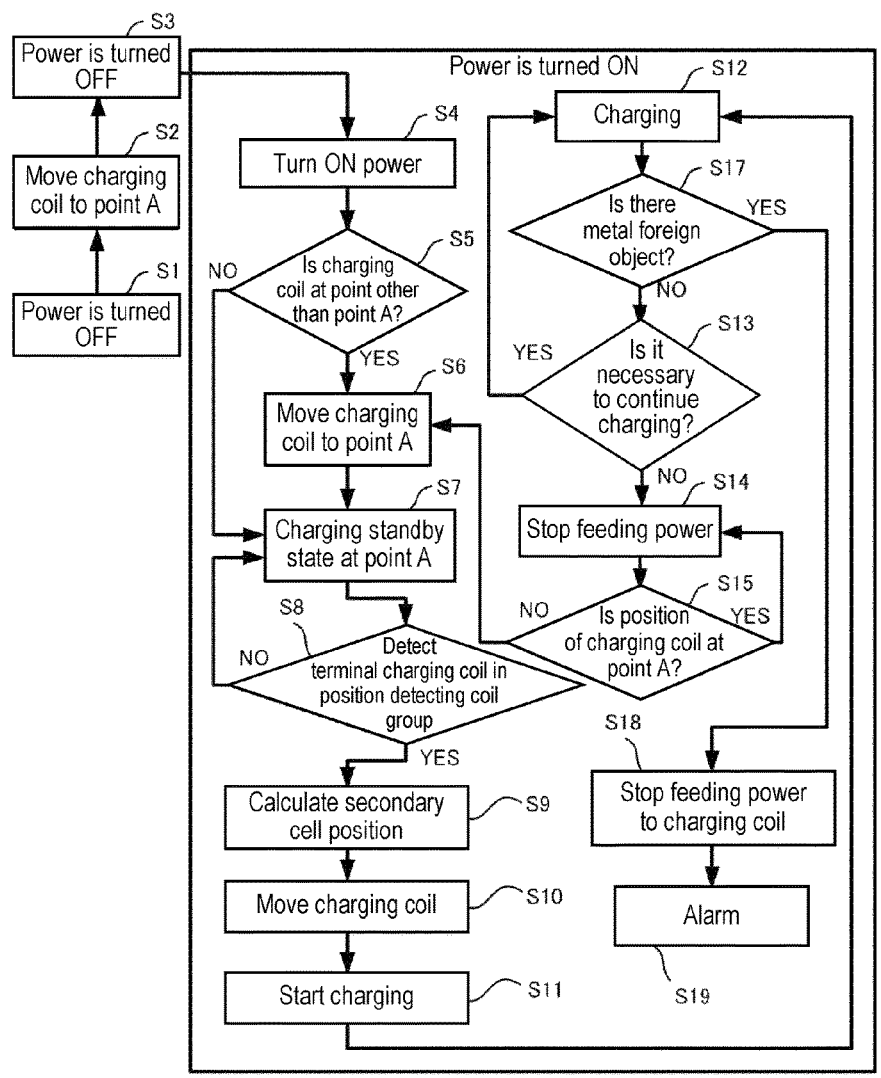
FIG. 10 is an operation flowchart of the mobile-terminal-charging device illustrated in FIG. 2.

Even in this state, in the present exemplary embodiment, first, controller 10 checks whether or not there is charging coil 8 at point A based on driving amounts of motors 28, 33 stored in X axis motor controller 36 and Y axis motor controller 37 (S5 in FIG. 10).

Further, when it is determined that there is no charging coil 8 at point A, controller 10 moves charging coil 8 to point A (S6 in FIG. 10), and is placed in a charging standby state at this point A (S7 in FIG. 10).

Next, controller 10 detects at which position of the upper surface of support plate 6 mobile terminal 15 is placed as illustrated in FIG. 3 by using position detecting coil 14 (S8, S9 in FIG. 10).

In addition, a place at which mobile terminal 15 is placed is actually a place of a mobile charging coil (not illustrated) built in mobile terminal 15.

Subsequently, controller 10 drives motors 28, 33 via X axis motor controller 36 and Y axis motor controller 37, moves charging coil 8 to a position of the mobile charging coil (not illustrated) of detected mobile terminal 15 (S10 in FIG. 10), and subsequently starts charging via charging coil controller 38 (S11, S12 in FIG. 10).

Further, during this charging, when whether or not it is necessary to continue charging (whether or not charging is finished) (S13 in FIG. 10) and charging is finished (fully charged) according to the same operation as that of Patent Literature 2, controller 10 finishes a charging operation (S14 in FIG. 10).

Furthermore, when this charging operation is finished, controller 10 checks whether or not there is charging coil 8 at point A (S15 in FIG. 10) and subsequently returns charging coil 8 to point A based on the driving amounts of motors 28, 33 stored in X axis motor controller 36 and Y axis motor controller 37 (S6 in FIG. 10).

In addition, when controller 10 cannot return charging coil 8 to point A, i.e., when, for example, some shock which occurs during driving causes misalignment between a position calculated based on the driving amount of motors 28, 33 stored in X axis motor controller 36 and Y axis motor controller 37 and an actual position measured by position detecting coil 14, a following operation is executed.

Figure 7:
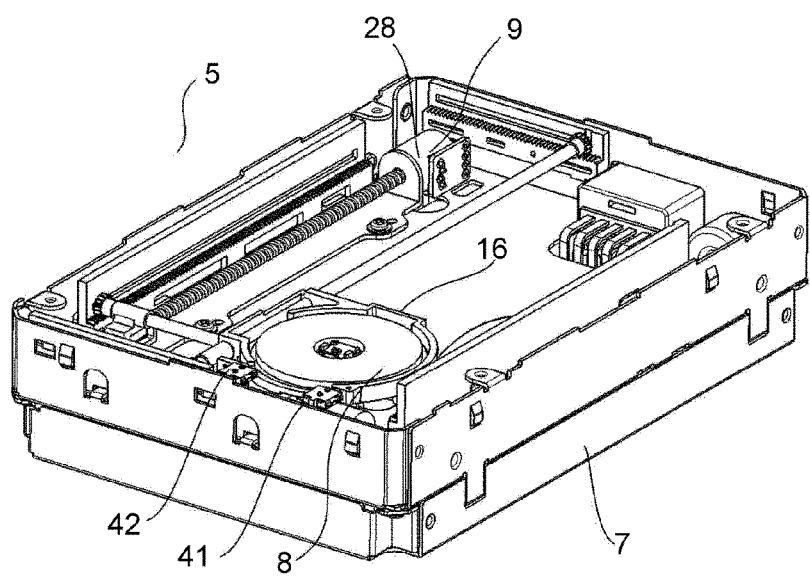
FIG. 7 is a perspective view illustrating another state of the mobile-terminal-charging device illustrated in FIG. 4.
Figure 8:
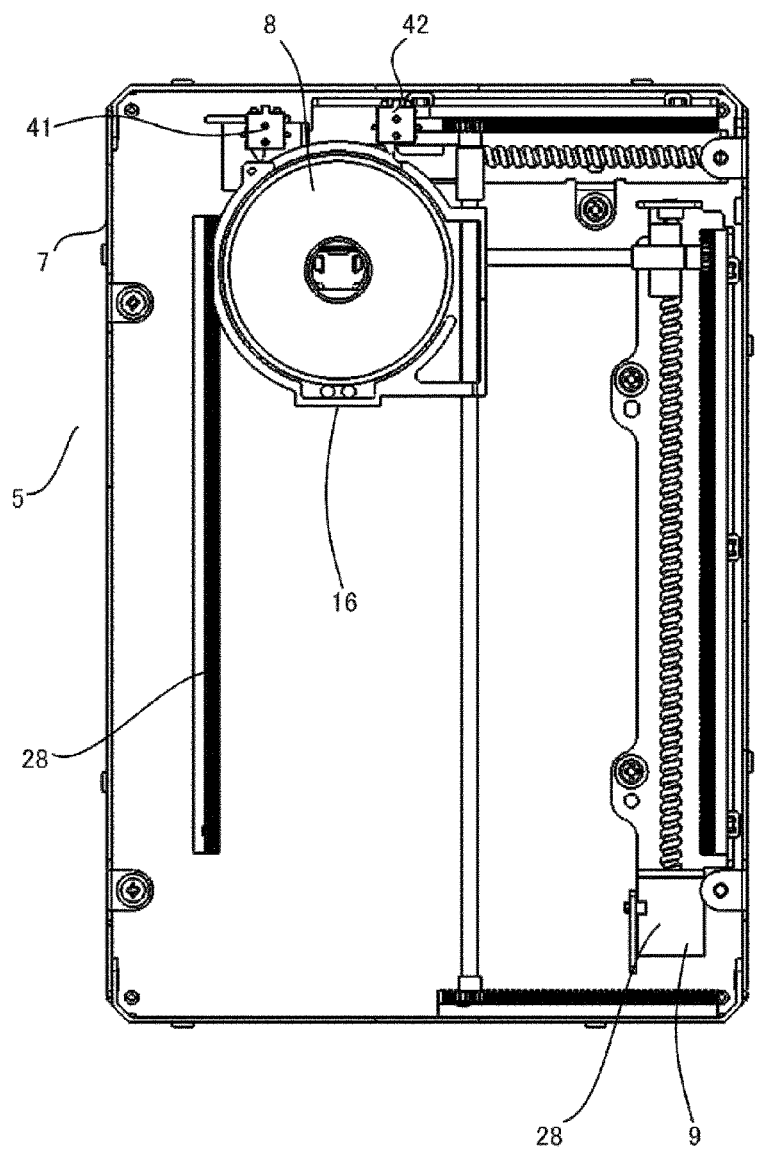
FIG. 8 is a plan view of the mobile-terminal-charging device in the state illustrated in FIG. 7.

That is, controller 10 drives motors 28, 33 via X axis motor controller 36 and Y axis motor controller 37, and moves charging coil 8 to a corner in main body case 7 as illustrated in FIGS. 7 and 8.

There are switches 41, 42 at this corner portion and, when charging coil 8 is moved to the corner in main body case 7, these switches 41, 42 operate and then controller 10 determines that charging coil 8 has moved to an initial value.

Further, in this state, operating amounts of motors 28, 33 driven by X axis motor controller 36 and Y axis motor controller 37 are initial values, and position control is performed again.

Figure 11:
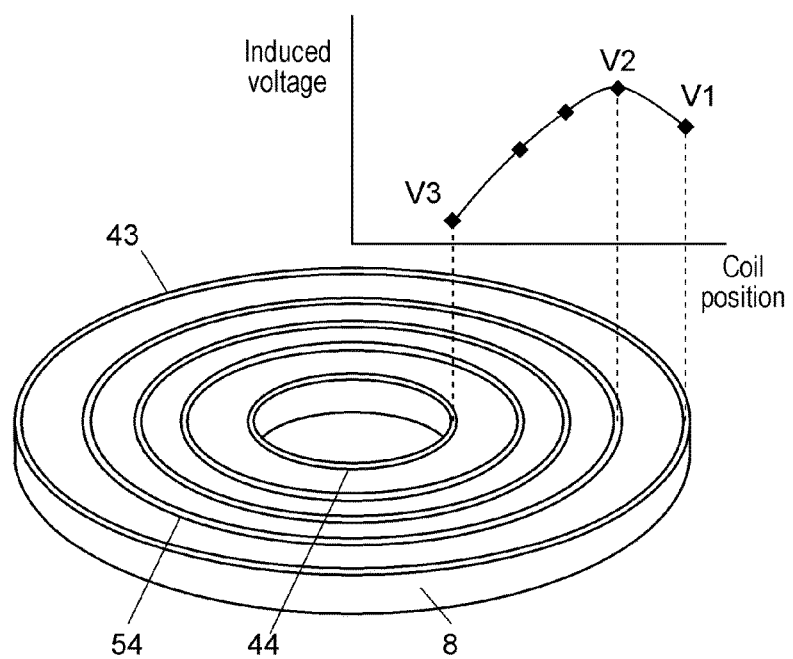
FIG. 11 is a perspective view of a detecting coil of the mobile-terminal-charging device illustrated in FIG. 2.
Figure 12:
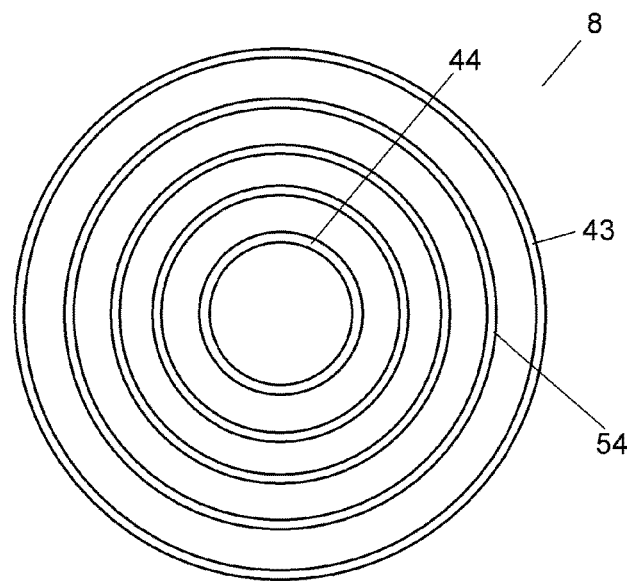
FIG. 12 is a plan view of the detecting coil illustrated in FIG. 11.

Next, the most distinct feature of the present exemplary embodiment will be described. The most distinct feature of the present exemplary embodiment is that, as illustrated in FIGS. 11 and 12, a plurality of detecting coils is coaxially provided between charging coil 8 and the mobile-terminal-placement portion of support plate 6 to detect a state where there is a metal foreign object on the upper surface (mobile-terminal-placement portion) of support plate 6. The word "coaxially" described herein means that axes of all detecting coils do not need to be strictly coaxial and may be misaligned more or less. That is, each detecting coil has a loop shape surrounding the same axis, and another detecting coil only needs to be disposed at an inner side or an outer side of one detecting coil. Further, shapes of the charging coil and each detecting coil may not be necessarily circular as illustrated in FIGS. 11 and 12 and may be elliptical or square.

In the present exemplary embodiment, detecting coil 43, detecting coil 54 which is disposed at the inner side of detecting coil 43 and has a smaller diameter than the diameter of detecting coil 43, and detecting coil 44 which is disposed at the inner side of detecting coil 54 and has a smaller diameter than that of detecting coil 54 are provided. The other detecting coils are illustrated to indicate a relationship between positions and induced voltages of the detecting coils described below, and are not indispensable components in the present exemplary embodiment.

The present exemplary embodiment employs a configuration where charging coil 8 is movable according to a place at which mobile terminal 15 is disposed, and a plurality of detecting coils is disposed on the upper surface of charging coil 8 (a surface at the side of support plate 6) and can move with charging coil 8.

Further, detecting coil 43 of a large diameter has a substantially same size as an outer diameter of charging coil 8 of an annular shape (slightly smaller than the outer diameter of charging coil 8). Detecting coil 44 of a small diameter has a substantially same size as an inner diameter of charging coil 8 of the annular shape (slightly larger than an inner diameter of charging coil 8). That is, detecting coil 43 has an outer diameter equal to the outer diameter of charging coil 8, and detecting coil 44 has an outer diameter equal to the inner diameter of charging coil 8.

Further, detecting coil 43, detecting coil 44, and detecting coil 54 are connected to controller 10 via voltage detectors 45, 46, and 55 as illustrated in FIG. 9.

In addition, programs for performing the operation illustrated in FIG. 10 and for performing a safety operation with respect to metal foreign objects by using these detecting coils are stored in memory 47 in FIG. 9.

In the present exemplary embodiment, it has been found that, when there is a metal foreign object between the mobile-terminal-placement portion (the upper surface of support plate 6) and mobile terminal 15, magnetic fluxes at an inner side of charging coil 8 decrease and, by contrast with this, magnetic fluxes at an outer side of charging coil 8 increase, and this state is detected by a plurality of detecting coil.

This state will be simplified for ease of understanding and described below with reference to FIGS. 13 to 17.

Figure 13:
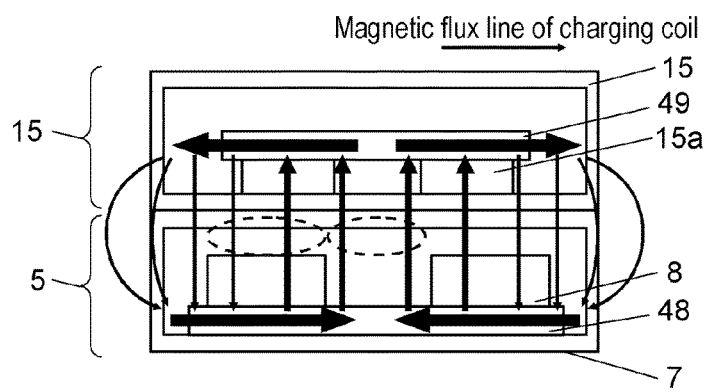
FIG. 13 is a view illustrating an operation of the mobile-terminal-charging device illustrated in FIG. 2.

Similar to FIG. 3, FIG. 13 illustrates a state where mobile terminal 15 is charged (S12 in FIG. 10) in a state where there is no metal foreign object between the mobile-terminal-placement portion (the upper surface of support plate 6) and mobile terminal 15.

In addition, in FIGS. 13 to 17, magnetic path forming magnetic body 48 is provided at a lower side of charging coil 8 (an opposite side to mobile terminal 15) in main body case 7 of mobile-terminal-charging device 5. Further, magnetic path forming magnetic body 49 is provided at an upper side of terminal charging coil 15a (an opposite side to mobile-terminal-charging device 5) in mobile terminal 15.

When the charging operation is performed, the magnetic fluxes are supplied from charging coil 8 of mobile-terminal-charging device 5 to terminal charging coil 15a of mobile terminal 15 as illustrated in FIG. 13, and then a voltage induced in terminal charging coil 15a charges mobile terminal 15.

In addition, the magnetic fluxes having passed terminal charging coil 15a returns to charging coil 8 via magnetic body 49, a space and magnetic body 48 as indicated by arrows.

Figure 14:
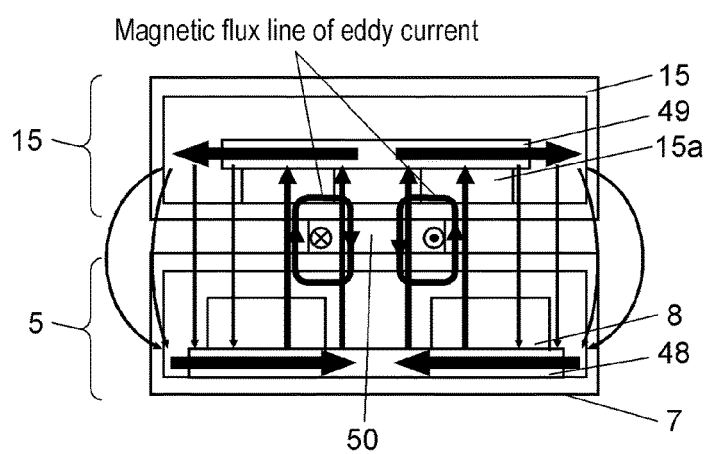
FIG. 14 is a view illustrating an operation of the mobile-terminal-charging device illustrated in FIG. 2.

By contrast with this, FIG. 14 illustrates a state where mobile terminal 15 is charged in a state where there is metal foreign object 50 of a non-magnetic body (such as a coin made of aluminum) between the mobile-terminal-placement portion (the upper surface of support plate 6) and mobile terminal 15.

In this case, as illustrated in FIG. 14, magnetic fluxes passing metal foreign object 50 induce an eddy current in metal foreign object 50 and, as a result, magnetic fluxes induced by this eddy current are produced.

The magnetic fluxes induced by the eddy current in this way travel in a direction opposite to a direction of the magnetic fluxes traveling from charging coil 8 to terminal charging coil 15a at an inner side of the magnetic fluxes (a center direction of charging coil 8). Further, the magnetic fluxes indicated by the counterclockwise arrows travel in a same direction as the direction of the magnetic fluxes traveling from charging coil 8 to terminal charging coil 15a at an outer side of the magnetic fluxes (a direction opposite to the center of charging coil 8).

Figure 15:
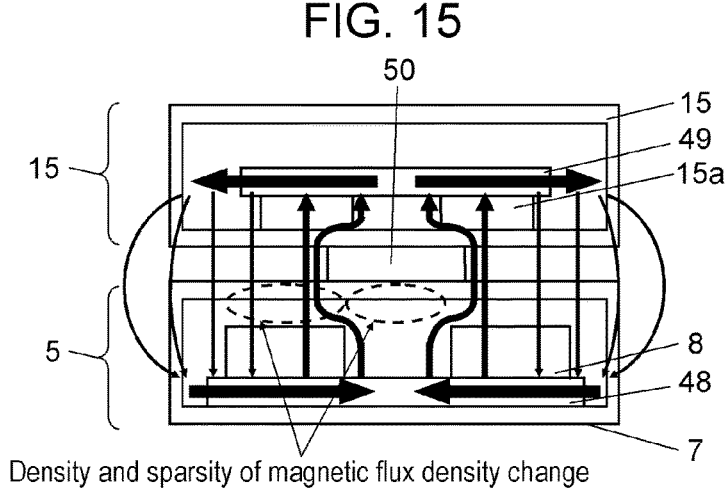
FIG. 15 is a view illustrating an operation of the mobile-terminal-charging device illustrated in FIG. 2.

As a result, as illustrated in FIG. 15, the magnetic fluxes traveling in an inner circumferential direction of charging coil 8 among the magnetic fluxes from charging coil 8 to terminal charging coil 15a are curved outward from the inner periphery of charging coil 8 and travel toward terminal charging coil 15a.

That is, the magnetic fluxes at the inner periphery of charging coil 8 decrease and, by contrast with, the magnetic fluxes at the outer periphery of charging coil 8 increase.

In such a situation, in the present exemplary embodiment, a plurality of detecting coils can detect the state in FIG. 15.

An induced voltage is produced in a plurality of detecting coils by the magnetic fluxes passing the inside of the coils. In this regard, voltage values detected by detecting coils 43, 54, 44 are V1, V2, V3, respectively. In the present exemplary embodiment, a peak voltage of the voltage (V1) detected by detecting coil 43 is detected by voltage detector 45, a peak voltage of the voltage (V3) detected by detecting coil 44 is detected by voltage detector 46, and a peak voltage of the voltage (V2) detected by detecting coil 54 is detected by voltage detector 55.

According to the program stored in memory 47, controller 10 compares a voltage value detected by a first detecting coil among a plurality of detecting coils, and a difference between voltage values detected by two detecting coils in a group including the first detecting coil and at least one detecting coil disposed at an outer side of the first detecting coil. In the present exemplary embodiment, detecting coil 44 is used as the "first detecting coil", and detecting coils 54 and 43 are used as the "two detecting coils". That is, controller 10 compares a voltage value (V3) detected by detecting coil 44 and a difference ($|V1-V2|$) between voltage values detected by two detecting coils 43, 54. When a state of a magnetic flux distribution as illustrated in FIG. 15 is detected as a result of the comparison, it is determined that there is metal foreign object 50 and the safety operation is executed.

In the present exemplary embodiment, controller 10 calculates a ratio of the voltage value (V3) detected by detecting coil 44 and the difference ($|V1-V2|$) between the voltage values detected by two detecting coils 43, 54. That is, controller 10 performs an arithmetic operation such as $f=|V1-V2|/V3$. Next, controller 10 compares a calculated f value and a set value (stored in memory 47).

In case of the magnetic flux distribution illustrated in FIG. 15, the f value increases compared to the magnetic flux distribution illustrated in FIG. 13, so that, when the f value becomes larger than the set value, the safety operation is executed.

An operation of controller 10 may be configured to calculate $f'=V3/|V1-V2|$. In this case, a change in the magnetic flux distribution illustrated in FIG. 15 decreases an f' value, so that, when the f' value becomes smaller than the set value, the safety operation is executed.

The safety operation executed by controller 10 includes the following operation. When, for example, the f value becomes larger than the set value, controller 10 determines that there is metal foreign object 50 (S17 in FIG. 10), immediately stops electric power supply to charging coil 8 (S18 in FIG. 10) and causes alarm 51 illustrated in FIG. 2 to operate (S19 in FIG. 10).

In addition, alarm 51 is connected to controller 10 as illustrated in FIG. 9, and therefore an abnormal state is notified by alarm 51 by way of lighting when there is such metal foreign object 50.

Next, optimal placement of the detecting coils will be described in the present exemplary embodiment.

Figure 18:
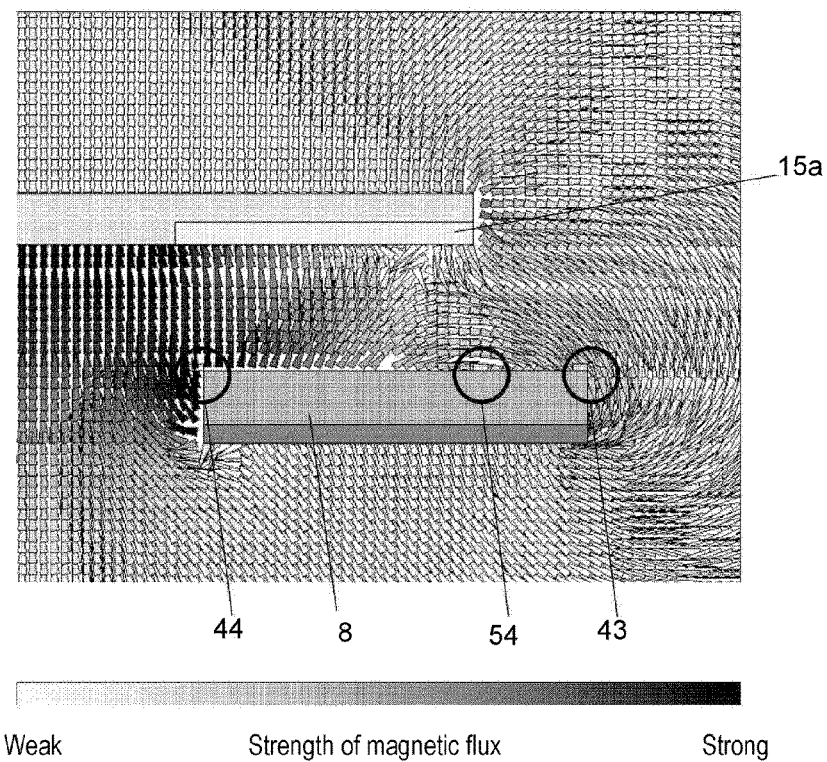
FIG. 18 is a view illustrating a result obtained by simulating a magnetic flux distribution illustrated in FIG. 13.

Detecting coil 54 according to the present exemplary embodiment is formed at a position at which the induced voltage is the maximum among a plurality of detecting coils as illustrated in FIG. 11. This position at which the induced voltage is the maximum is a boundary position between magnetic fluxes in the direction traveling from charging coil 8 to terminal charging coil 15a and magnetic fluxes in a direction returning from terminal charging coil 15a to charging coil 8. FIG. 18 illustrates this position in more detail. FIG. 18 is a view illustrating a result obtained by simulating the magnetic flux distribution illustrated in FIG. 13. A density of colors of arrows in FIG. 18 indicates strength of magnetic fluxes at each point, and the strength is higher when the color is denser. Further, directions of arrows in FIG. 18 indicate magnetic flux vector directions at each point. A position at which a vertical component of a magnetic flux vector is zero in FIG. 18, i.e., a position at which the arrow faces a horizontal direction in FIG. 18 is a boundary, and a magnetic flux direction changes from the direction traveling to terminal charging coil 15a to the direction returning to charging coil 8. By disposing the detecting coil at this boundary position, the induced voltage detected by this detecting coil is the maximum.

In addition, the boundary position in this magnetic flux direction is not influenced by a change in the shape of terminal charging coil 15a. This is because the detecting coil according to the present exemplary embodiment is installed near the surface of charging coil 8. The change in the shape of terminal charging coil 15a influences the magnetic flux distribution produced from charging coil 8, yet influences the magnetic flux distribution near the surface of charging coil 8 a little. Hence, the position of the detecting coil at which the induced voltage is the maximum does not depend on the shape of terminal charging coil 15a.

According to the present exemplary embodiment, by using detecting coil 43 (V1) which has substantially the same size as the outer diameter of charging coil 8 and detecting coil 54 (V2) at the position at which the induced voltage is the maximum, a difference between the induced voltages (|V1−V2|) is calculated. In case of this placement of the detecting coils, a value of |V1−V2| is determined based mainly on magnetic fluxes passing between detecting coil 43 and detecting coil 54, i.e., magnetic fluxes in the direction returning from terminal charging coil 15a to charging coil 8, and, by contrast with this, is hardly influenced by the magnetic fluxes in the direction traveling from charging coil 8 to terminal charging coil 15a. In this regard, the magnetic flux distribution in the direction traveling from charging coil 8 to terminal charging coil 15a is significantly influenced by an object, a number of turns and an inner diameter/outer diameter ratio and the like of terminal charging coil 15a. However, the magnetic flux distribution in the direction returning from terminal charging coil 15a to charging coil 8 is influenced a little by such conditions. Hence, in the present exemplary embodiment, by capturing only a change in the magnetic fluxes in the direction returning to charging coil 8, it is possible to detect only the change in the magnetic flux distribution caused by metal foreign object 50 without being influenced by the object, the number of turns and the inner diameter/outer diameter ratio and the like of terminal charging coil 15a.

As described above, the foreign object detector according to the present exemplary embodiment is not influenced by a type of terminal charging coil 15a, i.e., a type of mobile terminal 15 to be charged. Consequently, the mobile-terminal-charging device including this foreign object detector has versatility and is very user-friendly.

In addition, detecting coil 43 has substantially the same size as the outer diameter of charging coil 8 to capture as much magnetic fluxes in the direction returning to charging coil 8 as possible. By fixing a larger detecting coil than the outer shape of charging coil 8 to charging coil 8 by arbitrary means, it is possible to capture more magnetic fluxes in the direction returning to charging coil 8.

Further, the most preferably, the position of detecting coil 54 is aligned to the position at which the induced voltage is the maximum yet may be misaligned from this position more or less. When the position of detecting coil 54 is misaligned outward, this misalignment decreases an amount of captured magnetic fluxes in the direction returning to charging coil 8. By contrast with this, when the position of detecting coil 54 is misaligned inward, part of the magnetic fluxes in the direction traveling to terminal charging coil 15a are captured. Either way, a little misalignment is permitted to exhibit the effect according to the present exemplary embodiment.

Further, detecting coil 44 has substantially the same size as the inner diameter of charging coil 8 of the annular shape. However, a smaller detecting coil may be fixed to charging coil 8 by arbitrary means. It is preferable to design detecting coil 44 such that detecting coil 44 has substantially the same size as a size of a minimum metal foreign object which is normally assumed.

Further, three detecting coils 43, 54, 44 have been used in the present exemplary embodiment. However, a number of detecting coils is not limited to this. More detecting coils may be provided to enable an optional change of a combination of detecting coils to be used.

Figure 16:
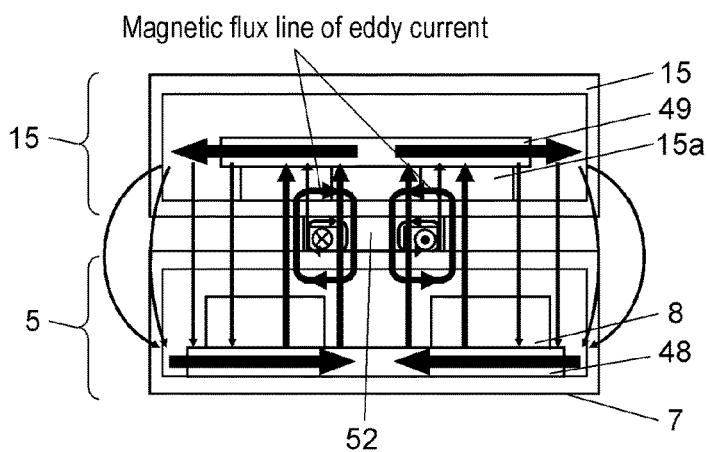
FIG. 16 is a view illustrating an operation of the mobile-terminal-charging device illustrated in FIG. 2.

FIG. 16 illustrates a state where mobile terminal 15 is charged in a state where there is metal foreign object 52 of a magnetic body (made of iron, for example) between the mobile-terminal-placement portion (the upper surface of support plate 6) and mobile terminal 15.

In this case, too, as illustrated in FIG. 16, magnetic fluxes passing metal foreign object 52 induce an eddy current in metal foreign object 52 and, as a result, magnetic fluxes induced by this eddy current are produced.

Metal foreign object 52 in this case is a magnetic body, and therefore magnetic fluxes traveling in metal foreign object 52 include passing magnetic fluxes and magnetic fluxes traveling inside metal foreign object 52 in an outer direction, for example. Hence, unlike FIG. 14, FIG. 16 doubly illustrates that magnetic fluxes produced by eddy currents.

In this regard, magnetic fluxes produced in such a double state travel in a direction opposite to the direction of the magnetic fluxes traveling from charging coil 8 to terminal charging coil 15a at an inner side of the magnetic fluxes (the center direction of charging coil 8), and travel in the same direction as the direction of the magnetic fluxes traveling from charging coil 8 to terminal charging coil 15a at an outer side (the direction opposite to the center of charging coil 8).

Figure 17:
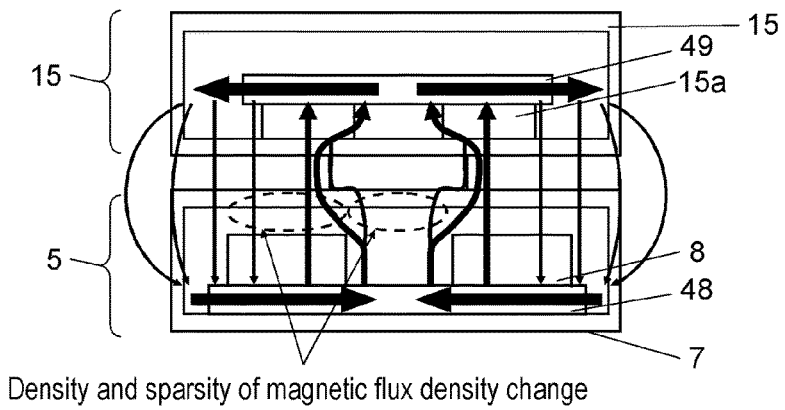
FIG. 17 is a view illustrating an operation of the mobile-terminal-charging device illustrated in FIG. 2.

As a result, as illustrated in FIG. 17, the magnetic fluxes traveling in an inner circumferential direction of charging coil 8 among the magnetic fluxes traveling from charging coil 8 to terminal charging coil 15a are curved outward from the inner periphery of charging coil 8 and travel toward terminal charging coil 15a (part of the magnetic fluxes at the outer periphery travel in metal foreign object 52).

That is, the magnetic fluxes at the inner periphery of charging coil 8 decrease and, by contrast with this, the magnetic fluxes at the outer periphery of charging coil 8 increase.

Similar to the state of the magnetic flux distribution illustrated in FIG. 15, this situation can be detected by a plurality of detecting coils 43, 44 and 54 provided at the upper surface side of charging coil 8 (the side of terminal charging coil 15a).

As described above, in the present exemplary embodiment, even when there is one of metal foreign object 50 of the non-magnetic body and metal foreign object 52 of the magnetic body between the mobile-terminal-placement portion (the upper surface of support plate 6) and mobile terminal 15, magnetic fluxes at the inner side of charging coil 8 decrease and, by contrast with this, the magnetic fluxes at the outer side of charging coil 8 increase. This state is detected by detecting coil 43, detecting coil 44, and detecting coil 54.

That is, the magnetic fluxes at the outer side increase and the magnetic fluxes at the inner side decrease, and therefore the value of the ratio of the voltage (V3) detected by detecting coil 44 and the difference (|V1−V2|) between the voltage values detected by two detecting coils 43, 54 changes. By detecting this change, it is possible to reliably detect presence of metal foreign objects 50, 52 and reliably execute the safety operation.

Further, as described above, this operation of detecting metal foreign objects 50, 52 is not substantially influenced by whether metal foreign objects 50, 52 are magnetic bodies or non-magnetic bodies or by a type of mobile terminal 15 to be charged, so that it is possible to provide a mobile-terminal-charging device which has versatility and is very user-friendly.

Second Exemplary Embodiment

Next, the second exemplary embodiment will be described. The present exemplary embodiment differs from the first exemplary embodiment in a number and placement of a plurality of detecting coils and an operation of controller 10.

Figure 19:
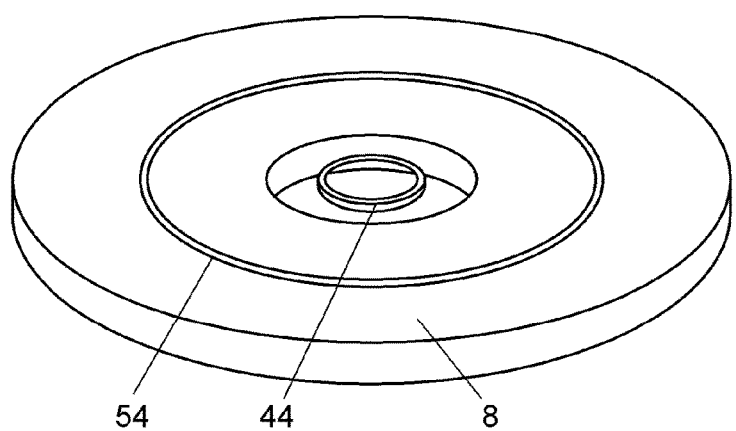
FIG. 19 is a perspective view of a detecting coil of a mobile-terminal-charging device according to a second exemplary embodiment of the present invention.

FIG. 19 illustrates placement of the detecting coil according to the present exemplary embodiment. In the present exemplary embodiment, detecting coil 54, and detecting coil 44 which is disposed at an inner side of detecting coil 54 and has a smaller diameter than a diameter of detecting coil 54 are provided.

Charging coil 8 is movable according to a place at which mobile terminal 15 is placed, and a plurality of detecting coils is disposed on the upper surface of charging coil 8 (a surface at the side of support plate 6) and is configured to be able to move with charging coil 8.

Further, detecting coil 54 of the large diameter is disposed at a position at which an induced voltage is the maximum as described in the first exemplary embodiment. Detecting coil 44 of the small diameter is smaller than an inner diameter of charging coil 8 of an annular shape.

According to a program stored in memory 47, controller 10 compares a voltage value detected by a first detecting coil among a plurality of detecting coils, and a difference between voltage values detected by two detecting coils in a group including the first detecting coil and a detecting coil disposed at an outer side of the first detecting coil. In the present exemplary embodiment, detecting coil 44 is used as the "first detecting coil", and detecting coils 44, 54 are used as the "two detecting coils". That is, while the detecting coils other than the "first detecting coil" are used for "two detecting coils" in the first exemplary embodiment, the "first detecting coil" is configured to function as one of the "two detecting coils" in the present exemplary embodiment.

According to such a configuration, a state of a magnetic flux distribution illustrated in FIG. 15 or FIG. 16 is detected.

More specifically, controller 10 calculates a ratio of a voltage value (V3) detected by detecting coil 44 and a difference (V2−V3) between the voltage values detected by two detecting coils 44, 54. That is, controller 10 performs an arithmetic operation such as $f=(V2-V3)/V3$. Next, controller 10 compares a calculated f value and a set value (stored in memory 47).

In case of the magnetic flux distribution illustrated in FIG. 15, the f value increases compared to the magnetic flux distribution illustrated in FIG. 13, so that, when the f value becomes larger than the set value, the safety operation is executed.

An operation of controller 10 may be configured to calculate $f'=V3/(V2-V3)$. In this case, a change in the magnetic flux distribution illustrated in FIG. 15 decreases an f' value, so that, when the f value becomes smaller than the set value, the safety operation is executed.

The safety operation executed by controller 10 includes the following operation. When, for example, the f value becomes larger than the set value, controller 10 determines that there is metal foreign object 50 (S17 in FIG. 10). Further, controller 10 immediately stops electric power supply to charging coil 8 (S18 in FIG. 10), and causes alarm 51 illustrated in FIG. 1 to operate (S19 in FIG. 10).

In addition, alarm 51 is connected to controller 10 as illustrated in FIG. 9, and therefore an abnormal state is notified by alarm 51 by way of lighting when there is such metal foreign object 50.

In the present exemplary embodiment, a position of detecting coil 54 is the position at which the induced voltage is the maximum. Hence, sensitivity to detect a change in a magnetic flux distribution caused by a metal foreign object improves. In this regard, a little misalignment is permitted to exhibit the effect according to the present exemplary embodiment.

Further, detecting coil 44 is smaller than the inner diameter of charging coil 8 of the annular shape, and, consequently, can detect presence of a smaller metal foreign object, too.

Furthermore, two detecting coils 54, 44 have been used in the present exemplary embodiment. However, a number of detecting coils is not limited to this. More detecting coils may be provided to enable an optional change of a combination of detecting coils to be used.

A mobile-terminal-charging device according to one exemplary embodiment of the present invention has been described. In addition, an example where mobile-terminal-charging device 5 is provided in vehicle interior 2 of vehicle 1 has been described in the above exemplary embodiment. This is because coins are frequently placed on support plate 6 in vehicle 1.

That is, inertia and a vibration in a traveling direction during driving displace mobile terminal 15 from an upper side of support plate 6 in vehicle 1. Therefore, as a countermeasure for this displacement, as illustrated in FIG. 3, guard 53 protruding upward compared to support plate 6 is provided at an outer periphery of support plate 6. Then, when a coin is placed on support plate 6, the coin hardly drops during driving, and this is because the coin is placed on support plate 6.

Hence, providing mobile-terminal-charging device 5 according to the present exemplary embodiment in vehicle interior 2 of vehicle 1 is very useful.

Further, a case where charging coil 8 is movable has been described as an example in the above exemplary embodiment. However, charging coil 8 may be a fixed type. In this case, detecting coils 43, 44, 54 can also be provided at any place of front surface plate 11, middle plate 12 and back surface plate 13 forming support plate 6.

As described above, the present invention provides a metal foreign object detector which is not substantially influenced by types of mobile terminals to be charged, and is user-friendly. Hence, use of the mobile-terminal-charging device in vehicles and at home is expected.

The invention claimed is:

1. A mobile-terminal-charging device comprising:
a support plate whose front surface side is a mobile-terminal-placement portion;
a charging coil which is disposed at a back surface side of the support plate to face to the support plate;
a plurality of detecting coils which is coaxially disposed on a plane of the charging coil facing to the support plate and includes a first detecting coil disposed at an innermost side;
a plurality of voltage detectors which is connected to the plurality of detecting coils, each of the plurality of detecting coils directly detecting a voltage value of each of the plurality of detecting coils;
a controller which is connected to each of the plurality of detecting coils via each of the plurality of voltage detectors,
wherein, during a charging operation, the controller compares a voltage value detected by the first detecting coil, and a difference between voltage values detected by two of the plurality of detecting coils coaxially disposed, and executes a safety operation according to a result of the comparison.

2. The mobile-terminal-charging device according to claim 1, wherein a first one of the two of the plurality of detecting coils is the first detecting coil.

3. The mobile-terminal-charging device according to claim 2, wherein a second one of the two of the plurality of detecting coils is a detecting coil indicating a maximum voltage value among the plurality of detecting coils.

4. The mobile-terminal-charging device according to claim 1, wherein
a first one of the two of the plurality of detecting coils has an outer diameter equal to an outer diameter of the charging coil, and
a second one of the two of the plurality of detecting coils is a detecting coil indicating a maximum voltage value among the plurality of detecting coils.

5. The mobile-terminal-charging device according to claim 1, wherein the controller detects a ratio of the voltage value detected by the first detecting coil and the difference between the voltage values detected by the two of the plurality of detecting coils, and compares a value of the ratio and a set value to compare the voltage value detected by the first detecting coil and the difference between the voltage values detected by the two of the plurality of detecting coils.

6. The mobile-terminal-charging device according to claim 1, wherein the charging coil has a wire spirally wound to form an annular shape.

7. The mobile-terminal-charging device according to claim 1, wherein the charging coil is movably disposed at the back surface side of the support plate and the plurality of detecting coils move with the charging coil.

8. The mobile-terminal-charging device according to claim 1, wherein an outer diameter of the first detecting coil is equal to an inner diameter of the charging coil.

9. The mobile-terminal-charging device according to claim 1, wherein the controller stops electric power supply to the charging coil as the safety operation.

10. The mobile-terminal-charging device according to claim 1, further comprising an alarm which is connected to the controller,
wherein the controller causes the alarm to operate as the safety operation.

11. A vehicle comprising:
a vehicle interior; and
the mobile-terminal-charging device according to claim 1 which is disposed in the vehicle interior with the mobile-terminal-placement portion facing upward.

12. The vehicle according to claim 11, wherein a guard protruding upward compared to the support plate is provided at an outer periphery of the support plate.

* * * * *